United States Patent
Cao et al.

(10) Patent No.: US 12,405,816 B2
(45) Date of Patent: Sep. 2, 2025

(54) VIRTUAL MACHINE LIVE MIGRATION METHOD AND COMMUNICATIONS DEVICE

(71) Applicant: HUAWEI TECHNOLOGIES CO., LTD., Guangdong (CN)

(72) Inventors: Shui Cao, Shanghai (CN); Yaochong Liu, Hangzhou (CN); Jun Qiu, Hangzhou (CN); Changchun Ouyang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 695 days.

(21) Appl. No.: 17/204,108

(22) Filed: Mar. 17, 2021

(65) Prior Publication Data

US 2021/0200573 A1    Jul. 1, 2021

Related U.S. Application Data

(63) Continuation of application No. PCT/CN2020/106044, filed on Jul. 31, 2020.

(30) Foreign Application Priority Data

Jul. 31, 2019   (CN) .......................... 201910704642.2

(51) Int. Cl.
G06F 9/455    (2018.01)

(52) U.S. Cl.
CPC .. G06F 9/45558 (2013.01); *G06F 2009/4557* (2013.01); *G06F 2009/45575* (2013.01);
(Continued)

(58) Field of Classification Search
None
See application file for complete search history.

(56) References Cited

U.S. PATENT DOCUMENTS

| 8,533,713 B2 | 9/2013 | Dong |
| 9,361,145 B1 | 6/2016 | Wilson et al. |

(Continued)

FOREIGN PATENT DOCUMENTS

| CN | 103888417 A | 6/2014 |
| CN | 103955399 A | 7/2014 |

(Continued)

OTHER PUBLICATIONS

Office Action issued in Chinese Application No. 201910704642.2 on Sep. 16, 2022, 12 pages.

(Continued)

*Primary Examiner* — Bradley A Teets
*Assistant Examiner* — Melissa A Headly
(74) *Attorney, Agent, or Firm* — Fish & Richardson P.C.

(57) ABSTRACT

Example virtual machine live migration methods and apparatus are described. In one example method, a first virtual machine which runs on a source server is migrated to a destination server. The source server includes a single-root input/output virtualization (SR-IOV) network adapter. The virtual machine manager delivers a live migration command to the live migration module. The live migration module obtains, according to the live migration command, information that needs to be migrated and that is about the first virtual machine, and reports the information to the virtual machine manager, where the information includes state information of the first virtual network adapter and memory data of the first virtual machine. The virtual machine manager sends the state information and the memory data of the first virtual machine to the destination server.

12 Claims, 7 Drawing Sheets

(52) U.S. Cl.
CPC .............. *G06F 2009/45579* (2013.01); *G06F 2009/45595* (2013.01)

(56) References Cited

U.S. PATENT DOCUMENTS

| | | | |
|---|---|---|---|
| 9,785,451 B1* | 10/2017 | Arroyo | ................ G06F 13/4221 |
| 10,002,018 B2 | 6/2018 | Anand et al. | |
| 2009/0100204 A1 | 4/2009 | Boyd et al. | |
| 2012/0011508 A1 | 1/2012 | Ahmad | |
| 2012/0254862 A1 | 10/2012 | Dong | |
| 2014/0215172 A1* | 7/2014 | Tsirkin | ................ G06F 11/2046 |
| | | | 711/162 |
| 2015/0052282 A1* | 2/2015 | Dong | ...................... H04L 49/70 |
| | | | 710/316 |
| 2017/0286149 A1* | 10/2017 | Lu | ....................... G06F 12/1027 |
| 2018/0293140 A1* | 10/2018 | Arroyo | ............... G06F 11/1451 |
| 2019/0146853 A1 | 5/2019 | Xu et al. | |
| 2019/0163521 A1* | 5/2019 | Lee | ....................... G06F 9/4856 |
| 2019/0361728 A1* | 11/2019 | Kumar | ................ G06F 12/1009 |
| 2020/0097056 A1* | 3/2020 | Wang | .................. G06F 9/45533 |

FOREIGN PATENT DOCUMENTS

| | | |
|---|---|---|
| CN | 103890728 B | 12/2015 |
| CN | 103201721 B | 5/2016 |
| CN | 106464579 A | 2/2017 |
| CN | 105612498 B | 3/2018 |
| CN | 108205506 A | 6/2018 |
| CN | 108874506 A | 11/2018 |

OTHER PUBLICATIONS

Extended European Search Report issued in European Application No. 20846078.2 on Aug. 2, 2022, 14 pages.
PCT International Search Report and Written Opinion issued in International Application No. PCT/CN2020/106044 on Nov. 2, 2020, 13 pages (partial English translation).

* cited by examiner

VIRTUAL MACHINE LIVE MIGRATION METHOD AND COMMUNICATIONS DEVICE

CROSS-REFERENCE TO RELATED APPLICATIONS

This application is a continuation of International Application No. PCT/CN2020/106044, filed on Jul. 31, 2020, which claims priority to Chinese Patent Application No. 201910704642.2, filed on Jul. 31, 2019. The disclosures of the aforementioned applications are hereby incorporated by reference in their entireties.

TECHNICAL FIELD

This application relates to the field of communications technologies, and in particular, to a virtual machine live migration method and a communications device.

BACKGROUND

Virtual machine live migration, also referred to as dynamic migration or online migration, indicates migrating a virtual machine from one physical server to another while ensuring normal running of an application service. A migration process has only a short suspended time to ensure availability of a client service in the migration process. A virtual machine is migrated between different hosts, so that a cluster can effectively allocate and schedule resources.

As an input/output (I/O) virtualization technology, a single-root input/output virtualization (SR-IOV) technology may be used to obtain a plurality of virtual PCIe devices on a physical peripheral component interconnect express (POO device through virtualization. Such a function is referred to as a virtual function (VF). An SR-IOV network adapter may be virtualized into a plurality of virtual network adapters. A virtual machine executes a service by using a virtual network adapter. Each virtual machine may bypass a virtual machine manager to directly exchange network I/O data with one or more virtual network adapters corresponding to the virtual machine. State information of the virtual network adapter is stored in a storage medium of the network adapter. The virtual machine manager cannot obtain the state information in the storage medium of the SR-IOV network adapter.

During the virtual machine live migration, the state information of the virtual network adapter corresponding to the virtual machine needs to be migrated from a source server to a destination server. Because the state information of the virtual network adapter is stored in the storage medium of the physical network adapter, the virtual machine manager is unaware of the storage medium of the SR-IOV network adapter, and cannot obtain the state information. Therefore, the state information of the virtual network adapter corresponding to the virtual machine cannot be migrated.

SUMMARY

Embodiments of this application provide a virtual machine live migration method, to implement live migration of an SR-IOV network adapter state. In this way, a physical machine that uses the SR-IOV network adapter can also perform a virtual machine live migration process.

A first aspect of the embodiments of this application provides a virtual machine live migration method, applied to a source server on which a first virtual machine runs. The method is used to migrate the first virtual machine to a destination server. The source server includes a single-root input/output virtualization SR-IOV network adapter. The source server runs the first virtual machine, a first virtual network adapter used by the first virtual machine, a virtual machine manager, and a live migration module. The first virtual network adapter is obtained through virtualization based on the SR-IOV network adapter. The method includes: The virtual machine manager delivers a live migration command to the live migration module. The live migration module obtains, according to the live migration command, information that needs to be migrated and that is about the first virtual machine, where the information that needs to be migrated and that is about the first virtual machine includes state information of the first virtual network adapter and memory data of the first virtual machine, and reports the information to the virtual machine manager. The virtual machine manager sends the state information and the memory data of the first virtual machine to the destination server.

When the first virtual machine in the source server is migrated from the source server to the destination server, the source server obtains a live migration request. The source server establishes a connection to the destination host, and sends a live migration message to the destination server according to the live migration request. The live migration message is used to indicate that the first virtual machine running on the host device is migrated to the destination server. The live migration module receives the live migration command delivered by the virtual machine manager according to the live migration request, and may obtain, by using the live migration module that is newly added, the state information of the first virtual network adapter corresponding to the first virtual machine. Then, the virtual machine manager sends the state information to the destination server. In this way, the state information may be migrated to the destination server, to implement migration of the first virtual machine.

In a possible implementation of the first aspect, that the live migration module obtains, according to the live migration command, information that needs to be migrated and that is about the first virtual machine includes: The live migration module copies according to the live migration command, the state information to the first memory space allocated by the virtual machine manager. The first memory space is not included in a virtual memory allocated to the first virtual machine.

According to the virtual machine live migration method provided in this embodiment of this application, the live migration module may copy the obtained state information to the first memory space allocated by the virtual machine manager. The first memory space is not included in the virtual memory allocated to the first virtual machine. The first virtual machine is unaware of the migration process.

In a possible implementation of the first aspect, that the live migration module copies according to the live migration command, the state information to the first memory space allocated by the virtual machine manager includes: The live migration module copies the state information from a base address register, a microprocessor, and microcode that are of the SR-IOV network adapter to the first memory space.

According to the virtual machine live migration method provided in this embodiment of this application, that the live migration module obtains the state information includes copying the state information from each of the base address register, the microprocessor, and the microcode that are of a physical network adapter. This provides a feasible implementation of obtaining the state information.

In a possible implementation of the first aspect, before the live migration module obtains, according to the live migration command, information that needs to be migrated and that is about the first virtual machine, the method further includes: The live migration module locks a first task queue of the first virtual network adapter, so that the first task queue cannot receive a new task. The first task queue is used to place a task delivered to the first virtual machine. A first virtual function driver of the first virtual machine empties all existing tasks in the first task queue.

In the migration process of the first virtual machine, if a user delivers, by using the first virtual machine, a user command to change the state information of the corresponding virtual network adapter, a case in which the state information of the virtual network adapter corresponding to the first virtual machine has been migrated to a target virtual machine before the command is executed may occur. An exception such as command timeout may occur. As a result, a service is interrupted. According to the virtual machine live migration method provided in this embodiment of this application, before obtaining the state information of the virtual network adapter, the live migration module may lock the first task queue, and the first virtual function driver may execute a task in the first task queue until the queue is emptied. In this way, the user cannot modify the state information of the virtual network adapter corresponding to the first virtual machine. This further avoids service exception.

In a possible implementation of the first aspect, after the virtual machine manager delivers a live migration command to the live migration module, the method further includes: The live migration module copies the memory data iteratively. When copying of the memory data that is remained can be completed once, after a first virtual function driver empties all existing tasks in the first task queue, the virtual machine manager suspends the first virtual machine. The live migration module copies the memory data for the last time.

According to the virtual machine live migration method provided in the embodiments of this application, when the live migration module copies the memory data iteratively and the copying of the memory data that is remained can be completed once, a channel for executing the user command is locked and emptied. After the channel for executing the user command is locked, the channel is no longer respond to a new user command. When the copying of the memory that is remained can be completed once, a lock operation is performed. This can reduce a phase duration in which the channel does not respond to the user command.

A second aspect of the embodiments of this application provides a virtual machine live migration method, applied to a destination server for virtual machine migration. The destination server includes an SR-IOV network adapter. The destination server runs a virtual machine manager and a live migration module. The method includes: The virtual machine manager obtains a live migration command. The live migration command is used to indicate that a first virtual machine in a source server is to be migrated to a second virtual machine in the destination server. The virtual machine manager receives state information of a first virtual network adapter corresponding to the first virtual machine sent by the source server. The live migration module restores the state information to the SR-IOV network adapter according to an instruction of the virtual machine manager.

When the first virtual machine in the source server is migrated from the source server to the second virtual machine in the destination server, the state information of the first network adapter corresponding to the first virtual machine also needs to be migrated to a physical network adapter in the destination server. The virtual machine manager receives the state information of the virtual network adapter corresponding to the first virtual machine sent by the source server. After receiving the state information, the virtual machine manager in the destination server needs to restore the state information to the physical network adapter by using the live migration module. In this way, the first virtual machine is successfully migrated.

In a possible implementation of the second aspect, that the live migration module restores the state information to the SR-IOV network adapter according to an instruction of the virtual machine manager includes: The live migration module restores the state information to each of a base address register, microcode, and a microprocessor that are of the SR-IOV network adapter.

According to the virtual machine live migration method provided in the embodiments of this application, the state information may be written into each of the base address register, the microcode, and the microprocessor that are of the physical network adapter. This improves feasibility of the solution.

In a possible implementation of the second aspect, that the live migration module restores the state information to each of a base address register, microcode, and a microprocessor that are of the SR-IOV network adapter includes: The live migration module copies first information in the state information to the microprocessor. The first information is information obtained from a read-only base address register in the source server. The microprocessor is configured to restore the first information to a read-only base address register of the SR-IOV network adapter.

The live migration module cannot directly write the first information obtained from the read-only base address register in the source server into the read-only base address register in the destination server, but copies the first information into the microprocessor for restoration. The microprocessor has a relatively high permission. Therefore, a problem that the first information cannot be directly written into the read-only base address register can be resolved.

In a possible implementation of the second aspect, before the virtual machine manager receives state information of a first virtual network adapter corresponding to the first virtual machine sent by the source server, the method further includes: The virtual machine manager allocates, by using the live migration module, identifier information of a second virtual network adapter corresponding to the second virtual machine.

According to the virtual machine live migration method provided in the embodiments of this application, before the state information of the virtual network adapter corresponding to the first virtual machine sent by the source server is received, global resource allocation is performed to avoid a conflict caused by occupation of global resources.

In a possible implementation of the second aspect, that the virtual machine manager receives state information of a first virtual network adapter corresponding to the first virtual machine sent by the source server includes: The virtual machine manager receives second information sent by the source server. The second information is locked state information of a second task queue of the second virtual network adapter corresponding to the second virtual machine. The second virtual network adapter is obtained through virtualization based on the SR-IOV network adapter. The second task queue is used to place a task delivered to the second virtual machine. The method further includes: The live migration module unlocks the second task queue.

According to the virtual machine live migration method provided in this embodiment of this application, a locked channel for executing a user command may be unlocked, to continue to execute a command delivered by a user after the state of the network adapter is restored.

The method further includes: The virtual machine manager receives memory data corresponding to the first virtual machine sent by the source server. The virtual machine manager restores the memory data corresponding to the first virtual machine.

A third aspect of the embodiments of this application provides a virtual machine live migration method, applied to a source server on which a first virtual machine runs. The method is used to migrate the first virtual machine to a destination server. The source server includes a single-root input/output virtualization SR-IOV network adapter. The source server runs the first virtual machine, a first virtual network adapter used by the first virtual machine, a virtual machine manager, and a physical function driver. The first virtual network adapter is obtained through virtualization based on the SR-IOV network adapter. The method includes: The virtual machine manager delivers a live migration command to the virtual function driver. The virtual function driver obtains, according to the live migration command, information that needs to be migrated and that is about the first virtual machine, where the information that needs to be migrated and that is about the first virtual machine includes state information of the first virtual network adapter corresponding to the first virtual machine and memory data of the first virtual machine; and reports the information to the virtual machine manager. The virtual machine manager sends the state information and the memory data of the first virtual machine to the destination server.

According to the virtual machine live migration method provided in the embodiments of this application, the virtual machine manager is unaware of a storage medium of the SR-IOV network adapter, and cannot obtain the state information of the virtual network adapter. The physical function driver may interact with the SR-IOV network adapter. In the embodiments of this application, the virtual machine manager is connected to the physical function driver by using VFIO, to obtain the state information of the virtual network adapter by using the physical function driver, and implement migration of the first virtual machine.

In a possible implementation of the third aspect, that the virtual function driver obtains, according to the live migration command, information that needs to be migrated and that is about the first virtual machine includes: The virtual function driver copies according to the live migration command, the state information to the first memory space allocated by the virtual machine manager. The first memory space is not included in a virtual memory allocated to the first virtual machine.

In a possible implementation of the third aspect, that the virtual function driver copies according to the live migration command, the state information to the first memory space allocated by the virtual machine manager includes: The virtual function driver copies the state information from a base address register, a microprocessor, and microcode that are of the SR-IOV network adapter to the first memory space.

In a possible implementation of the third aspect, before the virtual function driver copies according to the live migration command, the state information to the first memory space allocated by the virtual machine manager, the method further includes: The virtual function driver locks a first task queue of the first virtual network adapter, so that the first task queue cannot receive a new task. The first task queue is used to place a task delivered to the first virtual machine. A first virtual function driver that runs on the first virtual machine empties all existing tasks in the first task queue.

In a possible implementation of the third aspect, after the virtual machine manager obtains a live migration request, the method further includes: The virtual function driver copies the memory data iteratively. When copying of the memory data that is remained can be completed once, after a first virtual function driver empties all existing tasks in the first task queue, the virtual machine manager suspends the first virtual machine. The virtual function driver copies the memory data for the last time.

In a possible implementation of the third aspect, the virtual function driver is connected to the virtual machine manager by using a user-mode driver framework VFIO.

In a possible implementation of the third aspect, the virtual function driver includes a live migration module. The live migration module is configured to obtain the state information of the first virtual network adapter according to an instruction of the virtual machine manager.

According to the virtual machine live migration method provided in the embodiments of this application, the live migration module that is newly added may be used in the physical function driver to assist in implementing virtual machine live migration. The virtual machine manager is unaware of the storage medium of the SR-IOV network adapter, and cannot obtain the state information of the virtual network adapter. The physical function driver may interact with the SR-IOV network adapter. In the embodiments of this application, the live migration module is newly added to the physical function driver, and the virtual machine manager is connected to the live migration module by using the VFIO, to obtain the state information of the virtual network adapter by using the live migration module, and implements migration of the first virtual machine.

A fourth aspect of the embodiments of this application provides a virtual machine live migration method, applied to a destination server for virtual machine migration. The destination server includes an SR-IOV network adapter. The destination server runs a virtual machine manager and a physical function driver. The method includes: The virtual machine manager obtains a live migration command. The live migration command is used to indicate that a first virtual machine in a source server is to be migrated to a second virtual machine in the destination server. The virtual machine manager receives state information of a first virtual network adapter corresponding to the first virtual machine sent by the source server. The virtual function driver restores the state information to the SR-IOV network adapter according to an instruction of the virtual machine manager.

In a possible implementation of the fourth aspect, that the virtual function driver restores the state information to the SR-IOV network adapter according to an instruction of the virtual machine manager includes: The virtual function driver restores the state information to each of a base address register, microcode, and a microprocessor that are of the SR-IOV network adapter.

In a possible implementation of the fourth aspect, that the virtual function driver restores the state information to each of a base address register, microcode, and a microprocessor that are of the SR-IOV network adapter includes: The virtual function driver copies first information in the state information to the microprocessor. The first information is information obtained from a read-only base address register in the source server. The microprocessor restores the first information to a read-only base address register of the SR-IOV network adapter.

In a possible implementation of the fourth aspect, before the virtual machine manager receives state information of a first virtual network adapter corresponding to the first virtual machine sent by the source server, the method further includes: The virtual machine manager allocates, by using the virtual function driver, identifier information of a second virtual network adapter corresponding to the second virtual machine.

That the virtual machine manager receives state information of a first virtual network adapter corresponding to the first virtual machine sent by the source server includes: The virtual machine manager receives second information sent by the source server. The second information is locked state information of a second task queue of the second virtual network adapter corresponding to the second virtual machine. The second virtual network adapter is obtained through virtualization based on the SR-IOV network adapter. The second task queue is used to place a task delivered to the second virtual machine. The method further includes: The virtual function driver unlocks the second task queue.

In a possible implementation of the fourth aspect, the virtual function driver includes a live migration module. The live migration module is configured to restore the state information to the SR-IOV network adapter according to the instruction of the virtual machine manager.

According to the virtual machine live migration method provided in the embodiments of this application, the live migration module that is newly added may be used in the physical function driver to assist in implementing virtual machine live migration.

A fifth aspect of the embodiments of this application provides a communications device. The communications device is a source end for virtual machine live migration. The communications device runs a first virtual machine, a first virtual network adapter used by the first virtual machine, a virtual machine manager, and a live migration module. The first virtual network adapter is obtained through virtualization based on an SR-IOV network adapter. The communications device comprises: The virtual machine manager is configured to deliver a live migration command to the live migration module. The live migration module is configured to obtain, according to the live migration command, information that needs to be migrated and that is about the first virtual machine, and report the information to the virtual machine manager, where the information that needs to be migrated and that is about the first virtual machine includes state information of the first virtual network adapter and memory data of the first virtual machine. The virtual machine manager is further configured to send the state information and the memory data of the first virtual machine to the destination communications device.

In a possible implementation of the fifth aspect, the live migration module is configured to copy, according to the live migration command, the state information to the first memory space allocated by the virtual machine manager. The first memory space is not included in a virtual memory allocated to the first virtual machine.

In a possible implementation of the fifth aspect, the live migration module is configured to copy the state information from a base address register, a microprocessor, and microcode that are of the SR-IOV network adapter to the first memory space.

In a possible implementation of the fifth aspect, the live migration module is further configured to lock a first task queue of the first virtual network adapter, so that the first task queue cannot receive a new task. The first task queue is used to place a task delivered to the first virtual machine. The communications device further includes: a first virtual function driver of the first virtual machine, configured to empty all existing tasks in the first task queue.

In a possible implementation of the fifth aspect, the live migration module is further configured to copy the memory data iteratively. When copying of the memory data that is remained can be completed once, after the first virtual function driver empties all the existing tasks in the first task queue, the virtual machine manager is further configured to suspend the first virtual machine. The live migration module is further configured to copy the memory data for the last time.

A sixth aspect of the embodiments of this application provides a communications device. The communications device is a destination communications device for virtual machine live migration. The communications device includes an SR-IOV network adapter. The communications device runs a virtual machine manager and a live migration module. The virtual machine manager is configured to obtain a live migration command, where the live migration command is used to indicate that a first virtual machine in a source communications device is to be migrated to a second virtual machine in the destination communications device. The virtual machine manager is further configured to receive state information of a first virtual network adapter corresponding to the first virtual machine sent by the source communications device. The live migration module is further configured to restore the state information to the SR-IOV network adapter according to an instruction of the virtual machine manager.

In a possible implementation of the sixth aspect, the live migration module is configured to restore the state information to each of a base address register, microcode, and a microprocessor that are of the SR-IOV network adapter.

In a possible implementation of the sixth aspect, the live migration module is configured to copy first information in the state information to the microprocessor. The first information is information obtained from a read-only base address register in the source communications device. The microprocessor is configured to restore the first information to a read-only base address register of the SR-IOV network adapter.

In a possible implementation of the sixth aspect, the virtual machine manager is further configured to allocate, by using the live migration module, identifier information of a second virtual network adapter corresponding to the second virtual machine.

In a possible implementation of the sixth aspect, the virtual machine manager is configured to receive second information sent by the source communications device. The second information is locked state information of a second task queue of the second virtual network adapter corresponding to the second virtual machine. The second virtual network adapter is obtained through virtualization based on the SR-IOV network adapter. The second task queue is used to place a task delivered to the second virtual machine. The live migration module is further configured to unlock the second task queue.

A seventh aspect of the embodiments of this application provides a communications device. The communications device is a source communications device for virtual machine live migration, and includes a processor, a memory, and an SR-IOV network adapter. The processor is configured to run a first virtual machine, a virtual machine manager, and a live migration module. The first virtual machine runs a first virtual function driver. The processor performs, by using the virtual machine manager, the live migration module, and the first virtual function driver, the method in implementations provided in the first aspect.

In the communications device provided in the seventh aspect of the embodiments of this application, the processor, the memory, and the SR-IOV network adapter are electrically connected. Optionally, the communications device further includes a bus. The processor, the memory, and the SR-IOV network adapter are connected through the bus.

An eighth aspect of the embodiments of this application provides a communications device. The communications device is a destination communications device for virtual machine live migration, and includes a processor, a memory, and an SR-IOV network adapter. The processor is configured to run a virtual machine manager and a live migration module, and perform, by using the virtual machine manager and the live migration module, the method in implementations provided in the second aspect.

In the communications device provided in the eighth aspect of the embodiments of this application, the processor, the memory, and the SR-IOV network adapter are electrically connected. Optionally, the communications device further includes a bus. The processor, the memory, and the SR-IOV network adapter are connected through the bus.

A ninth aspect of the embodiments of this application provides a communications device. The communications device is a source communications device for virtual machine live migration, and includes a processor, a memory, and an SR-IOV network adapter. The processor is configured to run a first virtual machine, a virtual machine manager, and a physical function driver. The first virtual machine runs a first virtual function driver. The processor performs, by using the virtual machine manager, the physical function driver, and the first virtual function driver, the method in implementations provided in the third aspect.

In the communications device provided in the ninth aspect of the embodiment of this application, the processor, the memory, and the SR-IOV network adapter are electrically connected. Optionally, the communications device further includes a bus. The processor, the memory, and the SR-IOV network adapter are connected through the bus.

A tenth aspect of the embodiments of this application provides a communications device. The communications device is a destination communications device for virtual machine live migration, and includes a processor, a memory, and an SR-IOV network adapter. The processor is configured to run a virtual machine manager and a physical function driver, and perform, by using the virtual machine manager and the physical function driver, the method in implementations provided in the fourth aspect.

In the communications device provided in the tenth aspect of the embodiments of this application, the processor, the memory, and the SR-IOV network adapter are electrically connected. Optionally, the communications device further includes a bus. The processor, the memory, and the SR-IOV network adapter are connected through the bus.

An eleventh aspect of the embodiments of this application provides a computer program product including an instruction. When the computer program product runs on a computer, the computer is enabled to perform the steps in the implementations provided in the first aspect to the fourth aspect.

A twelfth aspect of the embodiments of this application provides a computer-readable storage medium including an instruction. When the instruction is run on a computer, the computer is enabled to perform the steps in the implementations provided in the first aspect to the fourth aspect.

A thirteenth aspect of the embodiments of this application provides a virtual machine live migration system, including the source communications device provided in the fifth aspect and the destination communications device provided in the sixth aspect.

According to the foregoing technical solutions, it can be learned that the embodiments of this application have the following advantages:

According to the virtual machine live migration method provided in the embodiments of this application, the live migration module may obtain the state information of the first virtual network adapter in the SR-IOV network adapter, and migrate the state information to the destination server. According to the virtual machine live migration method provided in the embodiments of this application, the state information can be migrated to a second virtual machine side, to ensure successful migration of the first virtual machine.

DESCRIPTION OF EMBODIMENTS

Embodiments of this application provide a virtual machine live migration method, to implement migration of state information of a network adapter. In this way, a physical machine that uses an SR-IOV network adapter can also perform a virtual machine live migration process.

Figure 1:
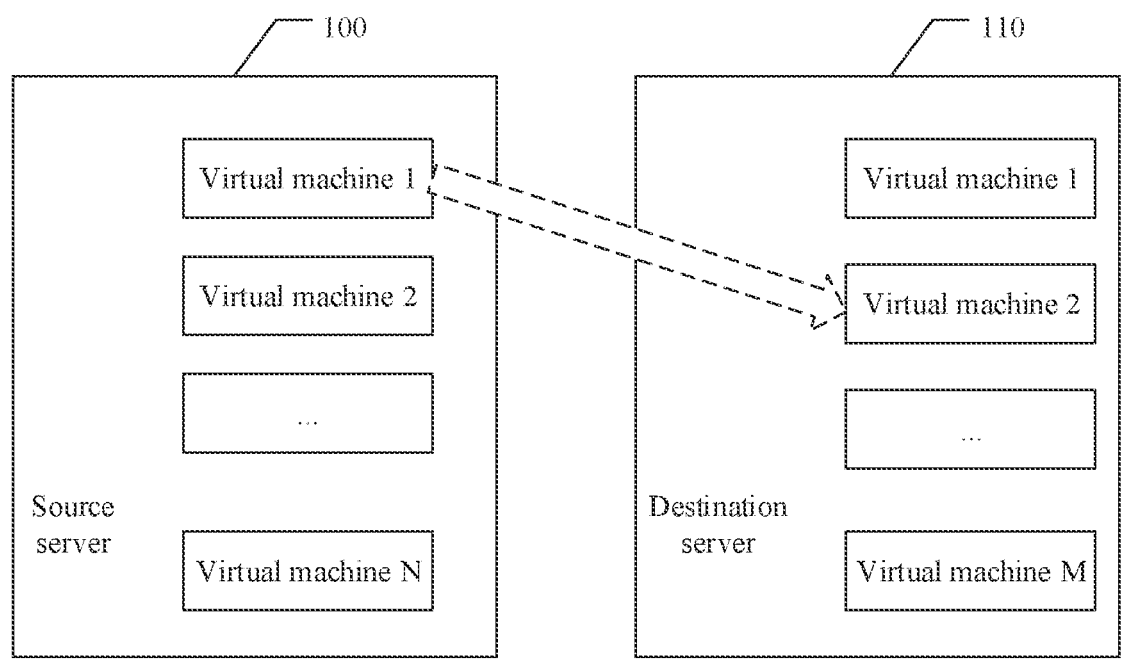
FIG. 1 is a schematic diagram of a migration architecture for virtual machine live migration.

FIG. 1 is a schematic diagram of a migration architecture virtual machine live migration.

The migration architecture includes a source server 100 before the virtual machine migration and a destination server 110 after the virtual machine migration. In a possible application scenario, a running state of a virtual machine 1 running on the source server 100 may be migrated to any virtual machine in the destination server 110, for example, the virtual machine 1 is migrated to a virtual machine 2.

Both the source server and the destination server are host machines on which a virtual machine manager is deployed, and can provide physical resources for a virtual machine. Usually, a plurality of virtual machines can be created on one host machine. A quantity of to-be-created virtual machines depends on hardware configuration of the host machine and specifications of the to-be-created virtual machines. A quantity N of virtual machines running on the source server 100 and a quantity M of virtual machines running on the destination server are not limited herein. In an actual application scenario, the host machine may be a server that provides various cloud services.

Figure 2:
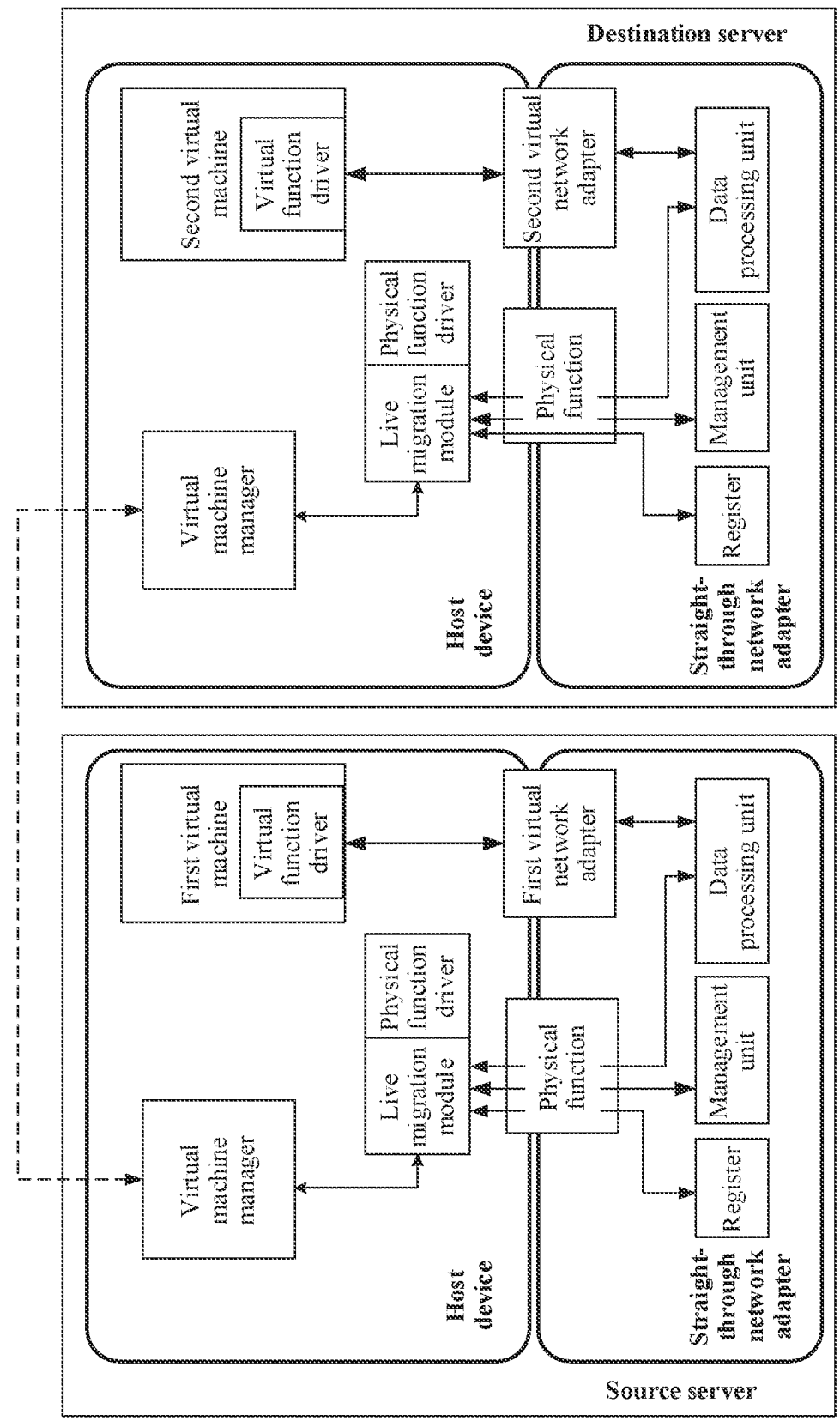
FIG. 2 is a schematic diagram of a system architecture for virtual machine live migration according to an embodiment of this application.

FIG. 2 is a schematic diagram of a virtual machine live migration system according to an embodiment of this application.

The system includes a source server before virtual machine migration and a destination server after the virtual machine live migration.

The source server includes a host and an SR-IOV network adapter. Specifically, the host runs at least one virtual machine. FIG. 2 shows only one first virtual machine VM 1 before the live migration.

The host further runs a virtual machine manager in the source server. The virtual machine manager may manage one or more virtual machines VMs. Each virtual machine VM may run an operating system and various applications running on the operating system.

The virtual machine manager may be a management module running on the host device, for example, a hypervisor or a virtual machine monitor (VMM), or may be implemented by using a customized logic chip. The virtual machine manager manages and controls a virtual machine. The management and controlling includes operations such as creating, migrating, powering on, and powering off the virtual machine. The virtual machine manager may be specifically QEMU (Quick EMUlator), VMWare, ESXi, a kernel-based virtual machine (KVM), or the like. This is not specifically limited herein.

A live migration module is a module that is newly added in this embodiment, provides a live migration interface for the virtual machine manager, and may assist in implementing the live migration according to an instruction of the virtual machine manager. In this embodiment of this application, the live migration module may be configured to obtain state information of a virtual network adapter corresponding to the virtual machine. Optionally, the live migration module is newly added to a physical function driver. The virtual machine manager is unaware of a storage medium of the SR-IOV network adapter, and cannot obtain the state information of the virtual network adapter. Therefore, a physical function driver may interact with the SR-IOV network adapter. The virtual machine manager is connected to the live migration module by using VFIO, and may obtain the state information of the virtual network adapter by using the live migration module, to implement migration of the first virtual machine.

The SR-IOV network adapter includes at least one physical function (PF) and at least one virtual function VF. In this embodiment, a virtual function of the SR-IOV network adapter is obtaining a virtual network adapter through virtualization. FIG. 2 shows only one physical function and one first virtual network adapter. One virtual machine corresponds to at least one virtual network adapter. The state information of the virtual network adapter may be stored in a base address register (BAR), a management unit, and a data processing unit that are of the SR-IOV network adapter. In this embodiment, the management unit includes a microprocessor, and the data processing unit includes microcode.

The host device further runs a PF driver that manages the SR-IOV network adapter. The PF driver may directly gain access to all resources of the PF, and configure and manage all VFs. Each virtual machine VM runs a VF driver to manage a corresponding VF.

The destination server includes a host and an SR-IOV network adapter. The host runs a virtual machine manager and a live migration module in the destination server. The host device is connected to the SR-IOV network adapter.

The live migration module in the destination server is a module that is newly added in this embodiment, provides a live migration interface for the virtual machine manager, and may assist in implementing the live migration according to an instruction of the virtual machine manager. In this embodiment of this application, the live migration module may be configured to restore the obtained state information of the virtual network adapter corresponding to the virtual machine to the SR-IOV network adapter. Optionally, the live migration module is newly added to a physical function driver. The virtual machine manager is connected to the live migration module by using VFIO.

It may be understood that, in an actual application, a server may be used as a source end of the virtual machine migration, and may also be used as a destination end of the virtual machine migration. Therefore, functions of software modules in the source server and the destination server that are provided in this embodiment may be integrated into one server for implementation.

It should be noted that, although not shown in FIG. 2, there is a communication link between the virtual machine manager and each virtual machine. Although not shown in FIG. 2, the host device further includes hardware related to running the virtual machine VM, for example, a central processing unit (CPU) and a memory of at least one computer-readable storage medium, including a hard disk, a memory, or the like. In addition, the host device may further include a communications unit, an input unit, a display unit, and the like.

Each virtual machine may directly exchange network I/O data with one or more virtual network adapters corresponding to the virtual machine. Therefore, there is no need to use the virtual machine manager. This reduces I/O performance overheads in the virtual machine manager, and ensures I/O throughput efficiency of each VM. Specifically, when sending and receiving a data packet from the virtual network adapter, the virtual machine VM can implement totally independent sending and receiving. The virtual machine manager is unaware of a process of writing by using direct memory access (DMA). The state information of the virtual network adapter corresponding to the virtual machine is stored in the storage medium of the SR-IOV network adapter. The virtual machine manager is also unaware of the state information.

Key technologies in virtual machine live migration include memory state migration and network adapter state migration.

Virtual machine memory state migration can usually include three phases:

An iteration pre-copy phase: After a virtual machine migration process is started, a virtual machine is still running on a source server, and a service of the virtual machine is not interrupted. All memory of the virtual machine is copied to a destination server, and then changed memory data of the virtual machine is iteratively copied to the destination server. When a size of the memory data that needs to be iteratively copied is less than a specified threshold, a stop-and-copy phase is entered.

A stop-and-copy phase: The virtual machine is suspended, the service is interrupted, and residual memory data of the virtual machine is copied.

A restoration phase: A destination virtual machine completes restoration processing before running, the destination virtual machine is started, and an entire migration process is complete.

There are a plurality of virtual machine memory migration manners. This is not limited in this embodiment of this application.

The network adapter state migration indicates migrating state information of a virtual network adapter corresponding to a to-be-migrated virtual machine from a source server to a destination server.

The to-be-migrated state information of the virtual network adapter in the virtual machine migration process includes the following types:

(1) Device information: The device information includes state information, an interrupt table, and the like, and is stored in BAR0/1 and BAR2/3 spaces of a BAR register.

(2) Interactive information and packet context of a chip and a host: The interactive information and packet context of the chip and the host include a response event queue, a mailbox, a control queue, a packet description queue, a queue state, and the like. Some are stored in space BAR0/1 of the BAR register. Some are stored in an internal entry of a network adapter chip in microcode and can be obtained and stored by using the microcode.

(3) Network adapter service context information: The network adapter service context information is mainly used to manage a VF function and a PF function, includes a function table, a MAC-VLAN table, an RSS template table, and the like, and can be obtained and stored by using the microprocessor.

The state information of the virtual network adapter is stored in a BAR register, microcode, and a microprocessor that are of an SR-IOV network adapter. Therefore, when the first virtual machine in the source server needs to be migrated to the second virtual machine in the destination server, a virtual machine manager in the source server cannot obtain the state information of the virtual network adapter corresponding to the first virtual machine in a storage medium of the SR-IOV network adapter. To implement successful migration of the first virtual machine, the state information of the first virtual network adapter also needs to be migrated to a second virtual machine side, so that a second virtual network adapter corresponding to the second virtual machine resumes working. To resolve the problem, in this embodiment of this application, a live migration module that is newly added may be used to obtain the state information of the first virtual network adapter in the network adapter. The virtual machine manager may copy the state information to the destination server, to finally ensure the successful migration of the first virtual machine.

Figure 3:
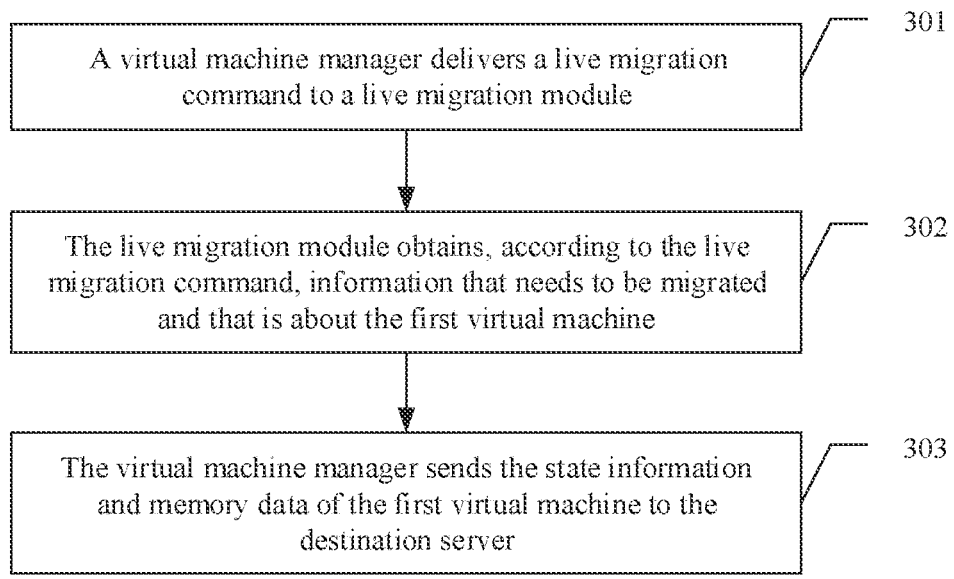
FIG. 3 is a schematic diagram of an embodiment of a virtual machine live migration method according to an embodiment of this application.

Based on the system architecture for the virtual machine live migration provided in FIG. 2, FIG. 3 is a schematic diagram of an embodiment of a virtual machine live migration method according to an embodiment of this application.

301: A virtual machine manager delivers a live migration command to the live migration module.

When a first virtual machine in a source server is migrated from the source server to a destination server, the source server obtains a live migration request. The source server establishes the connection to the destination host according to the live migration request, and sends the live migration request to the destination server. The live migration request indicates the first virtual machine in the source server to migrate to the destination server. The destination server may perform preparation work before the live migration. For example, the destination server pre-reserves a virtual machine resource for the first virtual machine.

The virtual machine manager obtains the live migration request in a plurality of manners. Optionally, a user sends the live migration request by using the source server, or the server determines, according to a preset rule, to perform the live migration on the first virtual machine. This is not specifically limited herein.

The virtual machine manager delivers the live migration command to the live migration module. It should be noted that the virtual machine manager may send a plurality of live migration commands to the live migration module in a migration process of the first virtual machine. A quantity of live migration commands is not limited herein. Optionally, the virtual machine manager sends different live migration commands to the live migration module in different phases of the live migration by using a user-mode driver framework (VFIO).

302: The live migration module obtains, according to the live migration command, information that needs to be migrated and that is about the first virtual machine.

The information that needs to be migrated and that is about the first virtual machine includes state information of the first virtual network adapter and memory data of the first virtual machine; and reports the information to the virtual machine manager.

The state information of the first virtual network adapter is stored in an SR-IOV network adapter, and specifically, stored in a BAR register, a management unit, and a data processing unit that are of the SR-IOV network adapter.

The virtual machine manager obtains, according to the live migration request, by using the live migration module, the state information of the first virtual network adapter, stored in the BAR register, the management unit, and the data processing unit that are of the SR-IOV network adapter.

Optionally, the virtual machine manager allocates first memory space. The live migration module obtains the state information of the first virtual network adapter from each of the BAR register, the microprocessor, and the microcode that are of the network adapter based on storage positions of the state information, and stores the state information in the first memory space. It should be noted that the first memory space does not belong to memory space corresponding to the first virtual machine, and is directly allocated and controlled by the virtual machine manager.

Optionally, the virtual machine manager sends a control command to the live migration module by using the VFIO.

303: The virtual machine manager sends the state information and the memory data of the first virtual machine to the destination server.

The virtual machine manager sends the memory data of the first virtual machine, obtained in the step 302 to the destination server for restoration, and the virtual machine manager further sends the state information obtained in the step 302 to the destination server, so that the destination server may perform network adapter state restoration on a migrated second virtual machine based on the state information. In this way, the live migration is implemented.

In this embodiment of this application, the source server may obtain the state information of the first virtual network adapter in the network adapter by using the live migration module that is newly added, and migrate the state information to the second virtual machine, in this way, the state information can be migrated to a second virtual machine side, to finally ensure successful migration of the first virtual machine.

Figure 4:
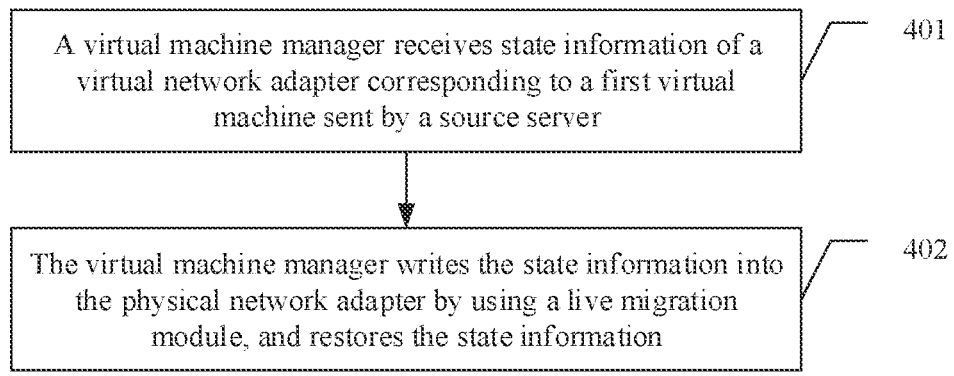
FIG. 4 is a schematic diagram of another embodiment of a virtual machine live migration method according to an embodiment of this application.

Based on the system architecture for the virtual machine live migration provided in FIG. 2, FIG. 4 is a schematic diagram of another embodiment of a virtual machine live migration method according to an embodiment of this application.

401: A virtual machine manager receives state information of a virtual network adapter corresponding to a first virtual machine sent by a source server.

When the first virtual machine in the source server is migrated from the source server to a second virtual machine in a destination server, the state information of the first network adapter corresponding to the first virtual machine also needs to be migrated to an SR-IOV network adapter in the destination server.

The virtual machine manager receives the state information sent by the source server.

402: The virtual machine manager restores the state information to the SR-IOV network adapter by using the live migration module.

After receiving the state information, the virtual machine manager in the destination server needs to restore the state information to each of a BAR register, microcode, and a microprocessor that are of the SR-IOV network adapter.

The state information obtained from a microprocessor and microcode that are in the source server may be directly written into the microprocessor and the microcode that are in the destination server.

A BAR register includes a BAR read-only register and a BAR writable register. The state information obtained from a BAR register of a source SR-IOV network adapter needs to be processed in two cases during restoration. Details are described as follows:

1. The state information copied from a BAR writable register may be directly written into a BAR writable register in the destination server.

2. The state information copied from a BAR read-only register needs to be restored by using the microprocessor and written into a BAR read-only register of the SR-IOV network adapter in the destination server.

After restoring the state information, the virtual machine manager in the destination server maz enable a network adapter, and then enable h second virtual machine, to complete live migration of the first virtual machine.

Optionally, the virtual machine manager sends a control command the live migration module by using VFIO.

In this embodiment of this application, the destination server receives the state information of the first virtual network adapter sent by the source server. The live migration module that is newly added may be used to restore the state information in the SR-IOV network adapter, so that the first virtual machine is successfully migrated.

Figure 5:
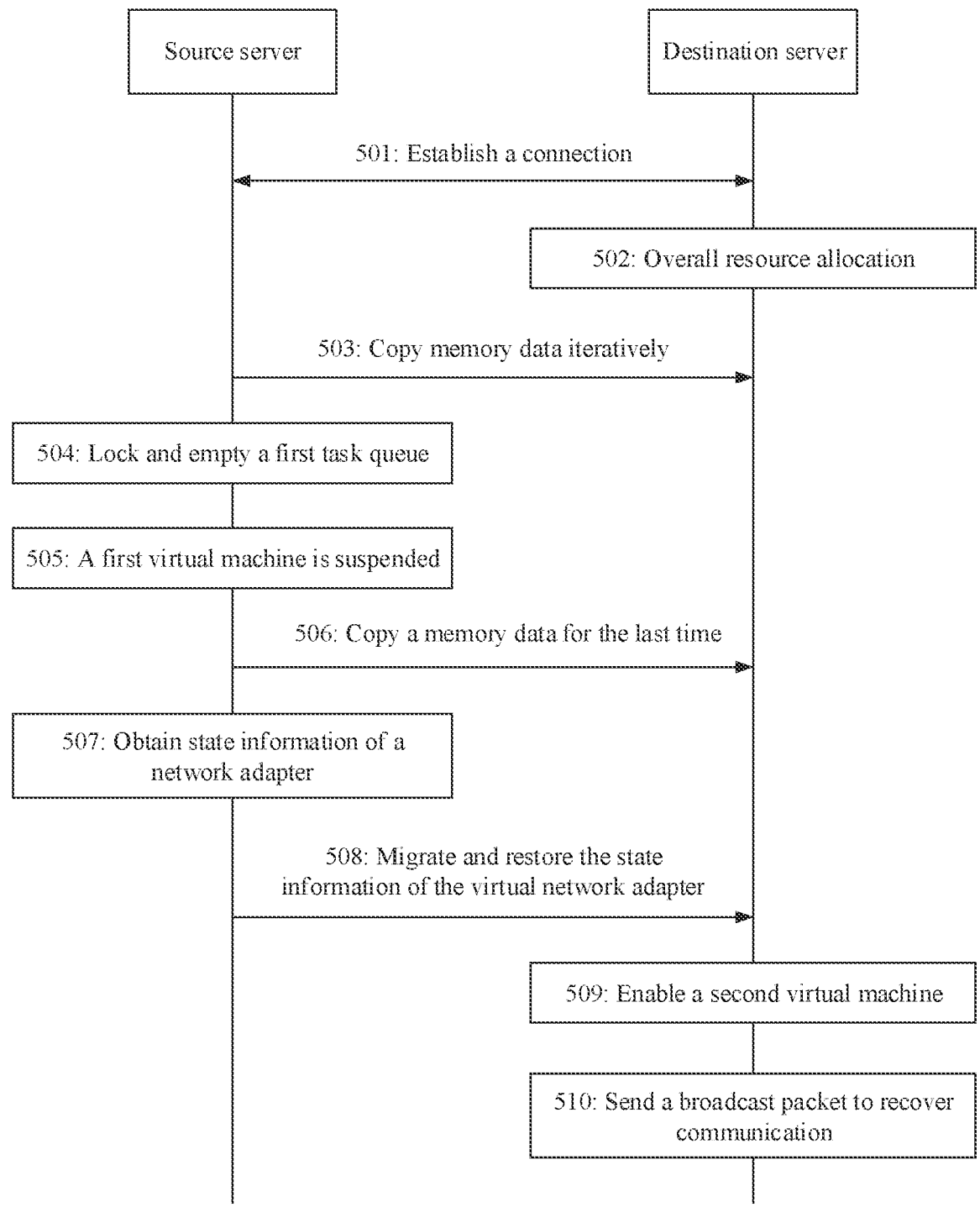
FIG. 5 is a schematic interaction diagram of an embodiment of a virtual machine live migration method according to an embodiment of this application.

Based on the system architecture for the virtual machine live migration provided in FIG. 2, FIG. 5 is a schematic interaction diagram of an embodiment of a virtual machine live migration method according to an embodiment of this application.

A virtual machine live migration technology is usually used in scenarios such as load balancing of a server, virtual machine disaster recovery, and virtual machine backup.

When a first virtual machine in a source server is migrated from the source server to a destination server, the first virtual machine may be migrated based on the virtual machine live migration solution provided in this embodiment of this application.

501: The source server establishes a connection to the destination server.

When the first virtual machine in the source server is migrated from the source server to the destination server, the source server obtains a live migration request. The source server establishes the connection to the destination host according to the live migration request, and sends the live migration request to the destination server. The live migration request indicates the first virtual machine in the source server to migrate to the destination server. The destination server may perform preparation work before the live migration. For example, the destination server pre-reserves a virtual machine resource for the first virtual machine.

Optionally, the source server receives a migration request from a user. The source server establishes the connection to the destination host according to a host IP (Internet Protocol) address of the destination server.

502: The destination server performs global resource allocation.

The destination server performs the global resource allocation. In other words, the destination server initializes VF resources to ensure availability of the VF resources. In the destination server, a virtual machine manager queries and applies for available global resources in an operating system by using a live migration module. The available global resources include identifier information of a second virtual network adapter corresponding to a second virtual machine.

Global resources are identifier information of a virtual network adapter, stored in the operating system for the virtual network adapter corresponding to a virtual machine. For example, the global resources are an index number (func_id), an RSS template table identifier, and q_cfg.

For example, in the source server, an index number of a first virtual network adapter corresponding to the first virtual machine is 1, and the first virtual machine is migrated to the second virtual machine in the destination server. In the destination server, the index number 1 may be occupied by another virtual machine, and an index number allocated by the destination server to the second virtual network adapter corresponding to the second virtual machine may be 2.

For example, the VF resource is not independently allocated. For example, in the RSS template table, an RSS used by each VF is globally allocated by a microprocessor, and rss_id at a source end is 1, but 1 may have been allocated to another VF at a destination end.

Optionally, the virtual machine manager at the destination end performs the global resource allocation by using a pre_active interface.

Optionally, in the destination server, a step in which the virtual machine manager allocates the identifier information of the virtual network adapter is referred to as a post_active procedure.

Optionally, a live migration module reallocates, by using a microprocessor, global resources corresponding to VFs, and then performs a state restoration procedure. The live migration module uses the microprocessor and microcode to set state information of a chip and configure a resource corresponding to the VM. After a procedure that the live migration module uses the microprocessor and the microcode to set the state information of the chip and configure the resource corresponding to the VM is completed, a virtual machine active operation is performed. According to the virtual machine live migration method provided in this embodiment of this application, configuration consistency between a VF at the migration source end and a target VF at the migration destination end is implemented, to ensure normal working of the virtual machine after the migration.

It should be noted that the step 502 is performed after the step 501 and before a step 508, and an execution sequence of the step 502 and steps 503 to 507 is not limited.

503: The source server copies memory data iteratively.

The virtual machine manager may copy the memory data iteratively according to the live migration request by using the live migration module. The first virtual machine migrates the memory data in a plurality of manners. This is not limited herein. Usually, copying of the memory data needs to be performed for a plurality of times. When a size of the memory data that needs to be iteratively copied is less than a specified threshold, a stop-and-copy phase is entered. Copying of the memory that is remained may be usually completed once.

504: The source server locks and empties a first task queue.

The first task queue is used to place a task delivered to the first virtual machine. The task is delivered by the user by using an application layer. The first task queue is referred to as a channel (cmdq) for executing a user command in an actual application process.

Optionally, the task includes a task related to the state information of the virtual network adapter corresponding to the first virtual machine.

Optionally, the task delivered by the user is a hardware operation. One hardware operation may be non-atomic. In other words, one hardware operation includes a combination of a plurality of operations. For example, during the VM live migration, a virtual function driver may operate hardware. However, one hardware operation is a combination of a plurality of interactions between a register or the hardware. The hardware operation is non-atomic. For example, when sending a mailbox message to a PF driver, the VF driver first writes the message into a header register, then writes the message into a data register, and finally writes the message into a request register to trigger VF hardware to start to read messages in both the header register and the data register and to send the messages to the destination PF. The PF returns a processing result to an asynchronous event queue (AEQ) of the VF. A VFD starts to process the result in the AEQ through interruption. During the migration, when the VM is suspended in any of the preceding processes, the VM is restored to a different state after being migrated to the destination server. As a result, an exception may occur, such as the mailbox message may be lost, or an invalid mailbox may be sent to the PF in the destination server.

Optionally, that the source server locks and empties a first task queue may be referred to as a pre_deactivate procedure.

In the migration process of the first virtual machine, if the user delivers, by using the first virtual machine, a user command to change the state information of the corresponding virtual network adapter, a case in which the state information of the virtual network adapter corresponding to the first virtual machine has been migrated to a target virtual machine before the command is executed may occur. An exception such as command timeout may occur. As a result, a service is interrupted.

To resolve this problem, in this embodiment of this application, the live migration module locks the channel for executing the user command, so that the channel cannot receive a new task delivered by the user. After the channel for executing the user command is locked, the user cannot modify the state information of the virtual network adapter corresponding to the first virtual machine, but the user service can still be continued.

That a first virtual function driver running on the first virtual machine empties the channel for executing the user command indicates completing execution of an existed user command when the queue is locked, and emptying the queue. The completion of emptying indicates completion of execution of the delivered user command. The live migration module may obtain information that the channel for executing the user command is emptied.

It should be noted that a state of the channel for executing the user command belongs to the state information of the to-be-migrated first virtual network adapter. After the source server locks the channel for executing the user command, the locked state is migrated to the destination server. After the destination server restores the state information, the channel for executing the user command may be unlocked.

Figure 6:
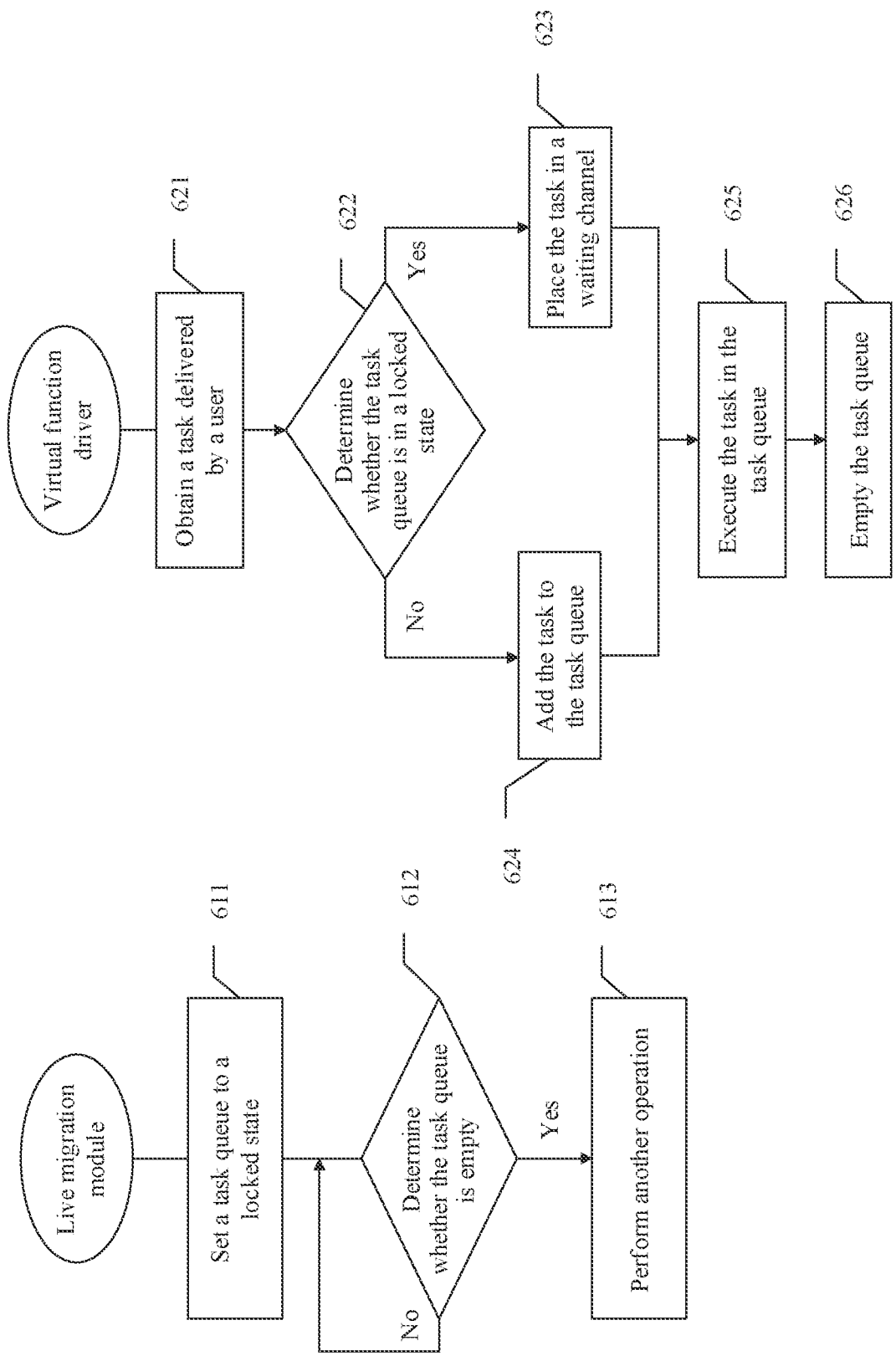
FIG. 6 is a schematic diagram of an embodiment of locking and emptying a task queue according to an embodiment of this application.

To further describe an implementation process in which a source server locks and empties a first task queue, FIG. 6 is a schematic diagram of an embodiment of locking and emptying a task queue according to an embodiment of this application.

1. On a live migration module side:

611: A live migration module sets the task queue to a locked state.

The live migration module may set the task queue to the locked state before obtaining state information of a first virtual network adapter. Optionally, the live migration module sets the task queue to the locked state before copying the memory for the last time.

It should be noted that the locked state of the task queue may be migrated to a destination server side. The task queue is unlocked on the destination server side, to continue to execute a user command.

612: The live migration module determines whether the task queue is empty, and if the task queue is empty, performs a step 613; or if the task queue is not empty, repeats the step 612.

613: If determining that the task queue is empty, the live migration module performs another operation.

If the task queue is empty, the live migration module may perform another operation, for example, reporting to a virtual machine manager. This is not specifically limited herein.

2. On a virtual function driver side:

621: A virtual function driver obtains a task delivered by a user.

622: The virtual function driver determines whether the task queue is in a locked state.

623: If the virtual function driver determines that the task queue is not in the locked state, the virtual function driver adds the task to the task queue.

624: If the virtual function driver determines that the task queue is in the locked state, the virtual function driver places the task in a waiting channel.

If the live migration module sets the task queue to the locked state, the task queue cannot receive a new task. If the user delivers the new task, the virtual function driver places the task in the waiting channel. After virtual machine migration is completed, the task queue is unlocked on the destination server. The task in the waiting channel can be added to the task queue for execution.

625: The virtual function driver executes the task in the task queue.

626: The virtual function driver empties the task queue.

In a specific implementation process, a parameter busy_state, a parameter own, and the like may be set for implementation. When the live migration module locks the task queue, busy_state is set to 1 and no new task is added to the task queue. When the task queue is unlocked, busy_state is set to 0 and the task can continue to be received. When the virtual function driver processes the task, own is 1. When the task is empty, own is 0, and func_ref indicates a quantity of to-be-executed commands.

Before the source VII pauses, the pre_deactivate procedure is used to ensure that a VFD message channel is suspended. If pre_deactivate is completed, all delivered messages have been processed. In this case, the VM can pause. Before the destination VM is resumed, the PFD is used to clear busy_state. After the destination VM is resumed, the suspended channel restores after detecting that the channel is not in a busy state. Then, the suspended channel continues to deliver messages accumulated in a source VFD. In a source migration procedure, busy_state is set to 1 in the pre_deactivate procedure. Then own is checked until own is 0. In a VFD uninterrupted flow procedure, if busy_state is 1, the message is processed until func_ref is 0. Then, an own bit is cleared until busy_state is changed to 0.

The virtual function driver executes the task in the task queue until the task in the task queue is empty. The live migration module can obtain whether the task in the task queue is empty.

It should be noted that the step 504 may be performed at any moment between the step 501 to a step 505. After the channel for executing the user command is locked, the channel no longer responds to the new user command. Optionally, after the step 503, when the memory iterative copy ends, and the copying of the memory that is remained may be completed once (at a moment log_sync), the step 504 is performed to reduce a phase duration in which no response is made to the user command.

505: The first virtual machine running on the source server is suspended.

After the source server determines that the channel for executing the user command is emptied, the virtual machine manager invokes a virtual machine suspending procedure to suspend the first virtual machine. The first virtual network adapter is disabled, the service is interrupted, and the first virtual machine is suspended.

506: The source server copies the memory of the destination server for the last time.

After the first virtual machine is suspended, the virtual machine manager copies the memory for the last time, and migrates the memory that is remained and is not copied in the step 503 to the destination server.

507: The source server obtains the state information of the first virtual network adapter.

The virtual machine manager obtains the state information of the first virtual network adapter, and copies the state information to a virtual machine manager in the destination server.

The virtual machine manager obtains, by using the live migration module, the state information of the first virtual network adapter corresponding to the first virtual machine. Specifically, the live migration module collaborates with a management unit and a data processing unit. The virtual machine manager allocates first memory space. The live migration module obtains the state information of the first virtual network adapter from each of a BAR register, a microprocessor, and microcode that are of the network adapter based on storage positions of the state information, and stores the state information in the first memory space. It should be noted that the first memory space does not belong to memory space corresponding to the first virtual machine, and is directly allocated and controlled by the virtual machine manager.

508: The source server sends the state information of the virtual network adapter to the destination server for restoration.

The virtual machine manager in the source server copies the state information stored in the first memory space to the virtual machine manager in the destination server.

After receiving the state information, the virtual machine manager in the destination server needs to restore the state information to each of a BAR register, microcode, and a microprocessor that are of the SR-IOV network adapter.

The state information obtained from a microprocessor and microcode that are in the source server may be directly written into the microprocessor and the microcode that are in the destination server.

A BAR register includes a BAR read-only register and a BAR writable register. The state information obtained from a BAR register of a source SR-IOV network adapter needs to be processed in two cases during restoration. Details are described as follows:

1. The state information copied from a BAR writable register may be directly written into a BAR writable register in the destination server.

2. The state information copied from a BAR read-only register needs to be restored by using the microprocessor and written into a BAR read-only register of the SR-IOV network adapter in the destination server. For example, a packet sending notification (Doorbell) register and a configuration control notification (Mailbox Req) register cannot restore a value in a writing manner in which a source end reads a destination end. Therefore, a chip state residing in the BAR read-only register cannot be directly migrated by copying MMIO space by using QEMU.

Optionally, the virtual machine manager receives second information sent by the source server. The second information is locked state information of a task queue of the second virtual network adapter corresponding to the second virtual machine. The second virtual network adapter is obtained through virtualization based on the SR-IOV network adapter. The second task queue is used to place a task delivered to the second virtual machine. The live migration module unlocks the second task queue.

Specifically, corresponding to the step 504, the destination server may unlock the task queue before enabling the second virtual machine. For example, busy_state is set to 0 to unlock the task queue.

509: The destination server enables the second virtual machine.

After the state information of the first virtual network adapter is migrated to the destination server, the destination virtual machine manager opens the locked channel for executing the user command, so that the user command can be normally executed.

The virtual machine manager in the destination server may enable a network adapter and enable the second virtual machine. Optionally, the virtual machine manager enables the network adapter by using an activate interface.

510: The destination server sends a broadcast packet to recover communication.

To shorten an interruption latency, the virtual machine manager in the destination server sends the broadcast packet to quickly restore the communication.

Optionally, the virtual machine manager sends the broadcast packet by using a post_resume interface.

It should be noted that the step 510 is an optional step, and may be performed or may not be performed. This is not limited herein.

In this embodiment of this application, the source server may obtain the state information of the first virtual network adapter in the network adapter by using the live migration module that is newly added, copy the state information to the memory allocated by the virtual machine manager, and send the state information to second virtual machine. The destination server receives the state information of the first virtual network adapter sent by the source server, and may restore the state information in the SR-IOV network adapter by using the live migration module that is newly added. The virtual machine migration system may implement migration of the state information of the first virtual network adapter, so that the first virtual machine is successfully migrated.

Figure 7:
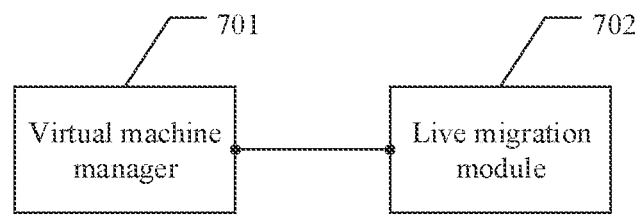
FIG. 7 is a schematic diagram of an embodiment of a source communications device according to an embodiment of this application.

The foregoing describes the virtual machine live migration method provided in the embodiments of this application. The following describes a communications device for implementing the method. FIG. 7 is a schematic diagram of an embodiment of a source communications device according to an embodiment of this application.

The embodiment of this application provides the communications device. Optionally, the communications device is a source server for virtual machine live migration. The source server runs a first virtual machine, a first virtual network adapter used by the first virtual machine, a virtual machine manager 701, and a live migration module 702. The first virtual network adapter is obtained through virtualization based on an SR-IOV network adapter. The communications device includes:

The virtual machine manager 701 is configured to deliver a live migration command to the live migration module 702;

the live migration module 702 is configured to obtain, according to the live migration command, information that needs to be migrated and that is about the first virtual machine, where the information that needs to be migrated and that is about the first virtual machine includes state information of the first virtual network adapter and memory data of the first virtual machine, and report the information to the virtual machine manager 701; and The virtual machine manager 701 is further configured to send the state information and the memory data of the first virtual machine to the destination server.

The live migration module 702 is specifically configured to copy, according to the live migration command, the state information to the first memory space allocated by the virtual machine manager 701. The first memory space is not included in a virtual memory allocated to the first virtual machine.

The live migration module 702 is specifically configured to copy the state information from a base address register, a microprocessor, and microcode that are of the SR-IOV network adapter to the first memory space.

The live migration module 702 is further configured to lock a first task queue of the first virtual network adapter, so that the first task queue cannot receive a new task. The first task queue is used to place a task delivered to the first virtual machine. The server further includes: a first virtual function driver of the first virtual machine, configured to empty all existing tasks in the first task queue.

The live migration module 702 is further configured to copy the memory data iteratively. When copying of the memory data that is remained can be completed once, after the first virtual function driver empties all the existing tasks in the first task queue, the virtual machine manager 701 is further configured to suspend the first virtual machine. The live migration module 702 is further configured to copy the memory data for the last time.

Figure 8:
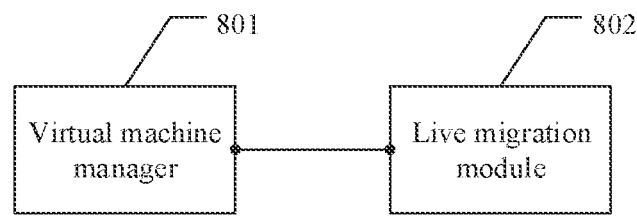
FIG. 8 is a schematic diagram of an embodiment of a destination communications device according to an embodiment of this application.

FIG. 8 is a schematic diagram of an embodiment of a destination communications device according to an embodiment of this application.

The embodiment of this application provides the communications device. Optionally, the communications device is a destination server for virtual machine live migration. The destination server includes an SR-IOV network adapter. The destination server runs a virtual machine manager 801 and a live migration module 802. The server includes: the virtual machine manager 801 is configured to obtain a live migration command; where the live migration command is used to indicate that a first virtual machine in a source server is to be migrated to a second virtual machine in the destination server; the virtual machine manager 801 is further configured to receive state information of a first virtual network adapter corresponding to the first virtual machine sent by the source server; and the live migration module 802, further configured to restore the state information to the SR-IOV network adapter according to an instruction of the virtual machine manager 801.

The live migration module 802 is specifically configured to restore the state information to each of a base address register, microcode, and a microprocessor that are of the SR-IOV network adapter.

The live migration module 802 is specifically configured to copy first information in the state information to the microprocessor. The first information is information obtained from a read-only base address register in the source server. The microprocessor is configured to restore the first information to a read-only base address register of the SR-IOV network adapter.

The virtual machine manager 801 is further configured to allocate, by using the live migration module 802, identifier information of a second virtual network adapter corresponding to the second virtual machine.

The virtual machine manager 801 is specifically configured to receive second information sent by the source server. The second information is locked state information of a second task queue of the second virtual network adapter corresponding to the second virtual machine. The second virtual network adapter is obtained through virtualization based on the SR-IOV network adapter. The second task queue is used to place a task delivered to the second virtual machine. The live migration module 802 is further configured to unlock the second task queue.

Figure 9:
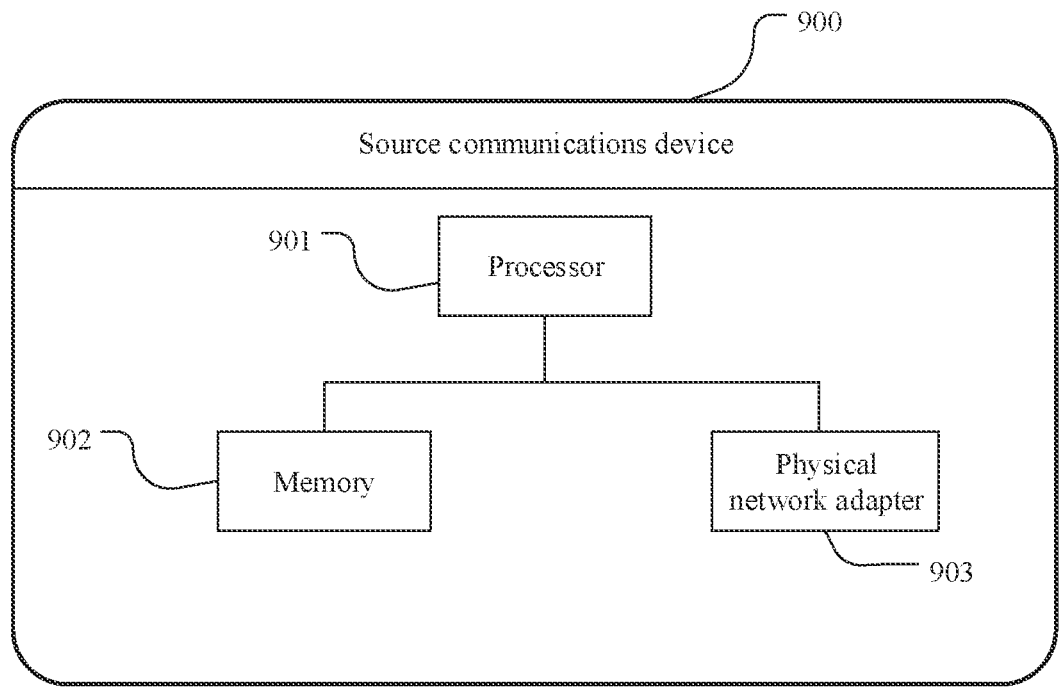
FIG. 9 is a schematic diagram of another embodiment of a source communications device according to an embodiment of this application.

FIG. 9 is a schematic diagram of another embodiment of a communications device according to an embodiment of this application. The communications device provided in this embodiment is a source server for virtual machine live migration. A specific device form of the communications device is not limited in this embodiment of this application.

The source communications device 900 may differ greatly due to different configurations or performance, and may include one or more processors 901 and memories 902. The memory 902 stores a program or data.

The memory 902 may be a volatile memory or a non-volatile memory. Optionally, the processor 901 is one or more central processing units (CPU). The CPU may be a single-core CPU, or may be a multi-core CPU. The processor 901 may communicate with the memory 902, and execute, on the source communications device 900, a series of instructions in the memory 902.

The source communications device 900 further includes a physical network adapter 903. The physical network adapter 903 is a PCIe device, namely, an SR-IOV network adapter.

Optionally, although not shown in FIG. 9, the source communications device 900 may further include one or more power supplies, one or more wired or wireless network interfaces, such as an Ethernet interface, and one or more input/output interfaces. The input/output interface may be configured to connect to a display, a mouse, a keyboard, a touchscreen device, a sensor device, or the like. The input/output interface is an optional component, and may exist or may not exist. This is not limited herein.

For a procedure performed by the processor 901 in the source communications device 900 in this embodiment, refer to the method procedure described in the method embodiments. Details are not described herein again.

Figure 10:
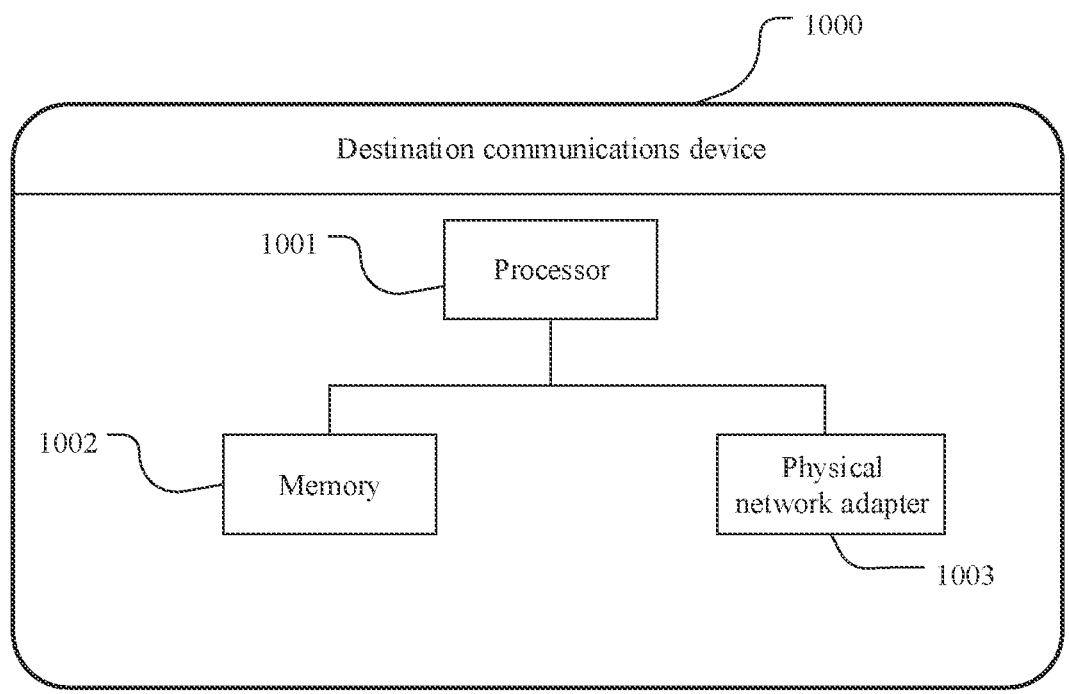
FIG. 10 is a schematic diagram of another embodiment of a destination communications device according to an embodiment of this application.

FIG. 10 is a schematic diagram of another embodiment of a communications device according to an embodiment of this application. The communications device provided in this embodiment is a destination server for virtual machine live migration. A specific device form of the communications device is not limited in this embodiment of this application.

The destination communications device 1000 may differ greatly due to different configurations or performance, and may include one or more processors 1001 and memories 1002. The memory 1002 stores a program or data.

The memory 1002 may be a volatile memory or a non-volatile memory. Optionally, the processor 1001 is one or more central processing units (CPU). The CPU may be a single-core CPU, or may be a multi-core CPU. The processor 1001 may communicate with the memory 1002, and execute, on the destination communications device 1000, a series of instructions in the memory 1002.

The destination communications device 1000 further includes a physical network adapter 1003. The physical network adapter 1003 is a PCIe device, namely, an SR-IOV network adapter.

Optionally, although not shown in FIG. 10, the destination communications device 1000 may further include one or more power supplies, one or more wired or wireless network interfaces, such as an Ethernet interface, and one or more input/output interfaces. The input/output interface may be configured to connect to a display, a mouse, a keyboard, a touchscreen device, a sensor device, or the like. The input/output interface is an optional component, and may exist or may not exist. This is not limited herein.

For a procedure performed by the processor 1001 in the destination communications device 1000 in this embodiment, refer to the method procedure described in the method embodiments. Details are not described herein again.

It may be clearly understood by persons skilled in the art that, for convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A virtual machine live migration method, applied to a source server on which a first virtual machine runs, wherein the method is used to migrate the first virtual machine to a destination server, wherein the source server comprises a single-root input/output virtualization (SR-IOV) network adapter, wherein the source server runs the first virtual machine, a first virtual network adapter used by the first virtual machine, a virtual machine manager, and a live migration module different from the virtual machine manager, wherein the first virtual network adapter is obtained through virtualization based on the SR-IOV network adapter, and wherein the method comprises:

delivering, by the virtual machine manager in the source server, a live migration command to the live migration module in the source server, wherein the live migration command is used to indicate that the first virtual machine in the source server is to be migrated to a second virtual machine in the destination server;

locking, by the live migration module, a first task queue of the first virtual network adapter, wherein the first task queue cannot receive a new task once it is locked, and wherein the first task queue is used to place a task delivered to the first virtual machine;

emptying, by a first virtual function driver of the first virtual machine, all existing tasks in the first task queue;

after locking the first task queue and emptying all the existing tasks in the first task queue, obtaining, by the live migration module according to the live migration command, information that needs to be migrated and that is about the first virtual machine, wherein the information that needs to be migrated and that is about the first virtual machine comprises state information of the first virtual network adapter and memory data of the first virtual machine;

reporting, by the live migration module, the information that needs to be migrated and that is about the first virtual machine to the virtual machine manager; and sending, by the virtual machine manager, the state information and the memory data of the first virtual machine to the destination server.

2. The method according to claim 1, wherein the obtaining, by the live migration module according to the live migration command, information that needs to be migrated and that is about the first virtual machine comprises:

copying, by the live migration module according to the live migration command, the state information to a first memory space allocated by the virtual machine manager, wherein the first memory space is not comprised in a virtual memory allocated to the first virtual machine.

3. The method according to claim 2, wherein the copying, by the live migration module according to the live migration command, the state information to a first memory space allocated by the virtual machine manager comprises:

copying, by the live migration module, the state information from a base address register, a microprocessor, and microcode that are of the SR-IOV network adapter to the first memory space.

4. The method according to claim 1, wherein after the delivering, by the virtual machine manager, a live migration command to the live migration module, the method further comprises:

copying, by the live migration module, the memory data iteratively;

when copying of the memory data that is remained can be completed once, and after the emptying, by a first virtual function driver, all existing tasks in the first task queue, suspending, by the virtual machine manager, the first virtual machine; and copying, by the live migration module, the memory data for a last time.

5. The method according to claim 1, wherein the live migration module provides a live migration interface for the virtual machine manager, and assists in implementing virtual machine live migration according to an instruction of the virtual machine manager.

6. The method according to claim 1, wherein the virtual machine manager is connected to the live migration module using a user-mode driver framework (VFIO).

7. A communications device, comprising at least one processor, one or more memories coupled to the at least one processor, and a single-root input/output virtualization (SR-IOV) network adapter, wherein:

the one or more memories store programming instructions for execution by the at least one processor to run a first virtual machine, a virtual machine manager, and a live migration module according to code in the one or more memories, wherein the first virtual machine comprises a first virtual function driver, wherein the one or more memories store the programming instructions for execution by the at least one processor further to perform operations by using the virtual machine manager, the live migration module, and the first virtual function driver, and wherein the operations comprise:

delivering, by the virtual machine manager in a source server, a live migration command to the live migration module in the source server, wherein the live migration command is used to indicate that the first virtual machine in the source server is to be migrated to a second virtual machine in a destination server;

locking, by the live migration module, a first task queue of a first virtual network adapter of the first virtual machine, wherein the first task queue cannot receive a new task once it is locked, and wherein the first task queue is used to place a task delivered to the first virtual machine;

emptying, by a first virtual function driver of the first virtual machine, all existing tasks in the first task queue;

after locking the first task queue and emptying all the existing tasks in the first task queue, obtaining, by the live migration module according to the live migration command, information that needs to be migrated and that is about the first virtual machine, wherein the information that needs to be migrated and that is about the first virtual machine comprises state information of the first virtual network adapter and memory data of the first virtual machine;

reporting, by the live migration module, the information that needs to be migrated and that is about the first virtual machine to the virtual machine manager; and sending, by the virtual machine manager, the state information and the memory data of the first virtual machine to the destination server.

8. The communications device according to claim 7, wherein the obtaining, by the live migration module according to the live migration command, information that needs to be migrated and that is about the first virtual machine comprises:

copying, by the live migration module according to the live migration command, the state information to a first memory space allocated by the virtual machine manager, wherein the first memory space is not comprised in a virtual memory allocated to the first virtual machine.

9. The communications device according to claim 8, wherein the copying, by the live migration module according to the live migration command, the state information to a first memory space allocated by the virtual machine manager comprises:

copying, by the live migration module, the state information from a base address register, a microprocessor, and microcode that are of the SR-IOV network adapter to the first memory space.

10. The communications device according to claim 7, wherein after the delivering, by the virtual machine manager, a live migration command to the live migration module, the operations further comprise:

copying, by the live migration module, the memory data iteratively;

when copying of the memory data that is remained can be completed once, and after the emptying, by a first virtual function driver, all existing tasks in the first task queue, suspending, by the virtual machine manager, the first virtual machine; and copying, by the live migration module, the memory data for the last time.

11. The communications device according to claim 7, wherein the live migration module provides a live migration interface for the virtual machine manager, and assists in implementing virtual machine live migration according to an instruction of the virtual machine manager.

12. The communications device according to claim 7, wherein the virtual machine manager is connected to the live migration module using a user-mode driver framework (VFIO).

* * * * *